United States Patent [19]
Dreher et al.

[11] 3,954,627
[45] May 4, 1976

[54] LAMELLAR MICELLE CONTAINING COMPOSITIONS WHICH EXHIBIT RETRO-VISCOUS PROPERTIES

[75] Inventors: Karl D. Dreher, Littleton, Colo.; William B. Gogarty, Findlay, Ohio

[73] Assignee: Marathon Oil Company, Findlay, Ohio

[22] Filed: Nov. 7, 1973

[21] Appl. No.: 413,462

Related U.S. Application Data

[63] Continuation-in-part of Ser. No. 375,293, June 29, 1973, abandoned.

[52] U.S. Cl. .............................. 252/8.5 P; 166/308; 175/65; 252/8.5 C; 252/33.3; 252/308; 252/309; 252/312
[51] Int. Cl.$^2$ ...................... C09K 7/02; E21B 43/26
[58] Field of Search .......... 252/8.5 A, 8.5 C, 8.5 M, 252/8.5 P, 8.55 D, 308, 309, 312; 166/274, 275, 308; 175/65

[56] References Cited
UNITED STATES PATENTS

| | | | |
|---|---|---|---|
| 3,254,714 | 6/1966 | Gogarty et al. | 166/274 |
| 3,275,075 | 9/1966 | Gogarty et al. | 166/274 |
| 3,477,511 | 11/1969 | Jones et al. | 166/274 |
| 3,734,856 | 5/1973 | Son | 252/8.5 |
| 3,822,746 | 7/1974 | Gogarty | 166/275 X |

FOREIGN PATENTS OR APPLICATIONS

921,690  2/1973  Canada

*Primary Examiner*—Herbert B. Guynn
*Attorney, Agent, or Firm*—Karl D. Dreher

[57] ABSTRACT

Compositions containing lamellar micelles and which exhibit retro-viscous property at noncryogenic temperatures are prepared by mixing 4–15 percent of a surfactant (preferably an alkaryl sulfonate having an average equivalent weight of 350–525), 30–70 percent of a liquid hydrocarbon, 15–66 percent of water and optionally up to 20 percent of a cosurfactant, preferably an alcohol containing 1–20 carbon atoms, and/or electrolyte (preferably inorganic salt). The micelles have an axial ratio of at least 3.5 and preferably the composition has a viscosity of at least 75 cp. at a shear rate of 10 sec$^{-1}$ at 23°C. The composition is substantially optically clear, phase stable, birefringent, and the flow properties are such that substantially large increases in flow rate, e.g. 20-fold, can be realized at very small increases in pressure drop, e.g. 5 percent. Uses for the compositions include stimulation of wells (e.g. fracturing fluids), drilling fluids, carrier fluids in pipelines, fluidics, cutting oils, and similar applications.

13 Claims, 3 Drawing Figures

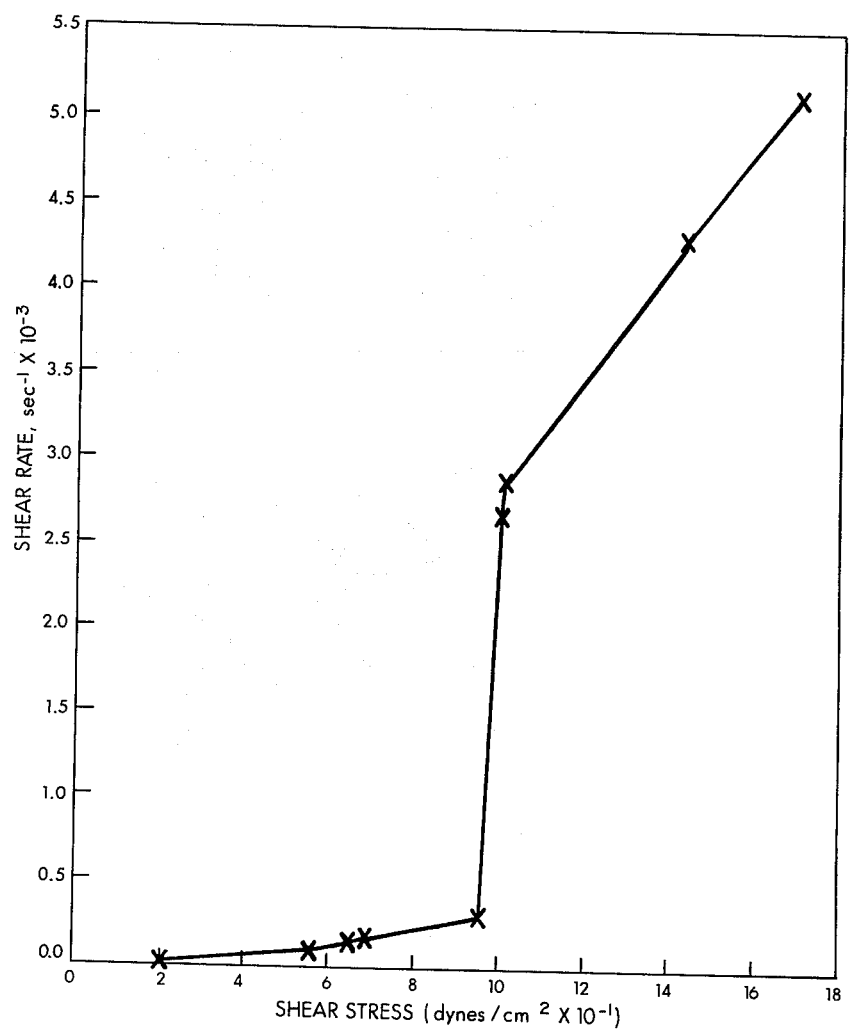
Fig. 1 SHEAR RATE vs. SHEAR STRESS

Fig. 2 PRESSURE DROP vs. FLOW RATE CURVE
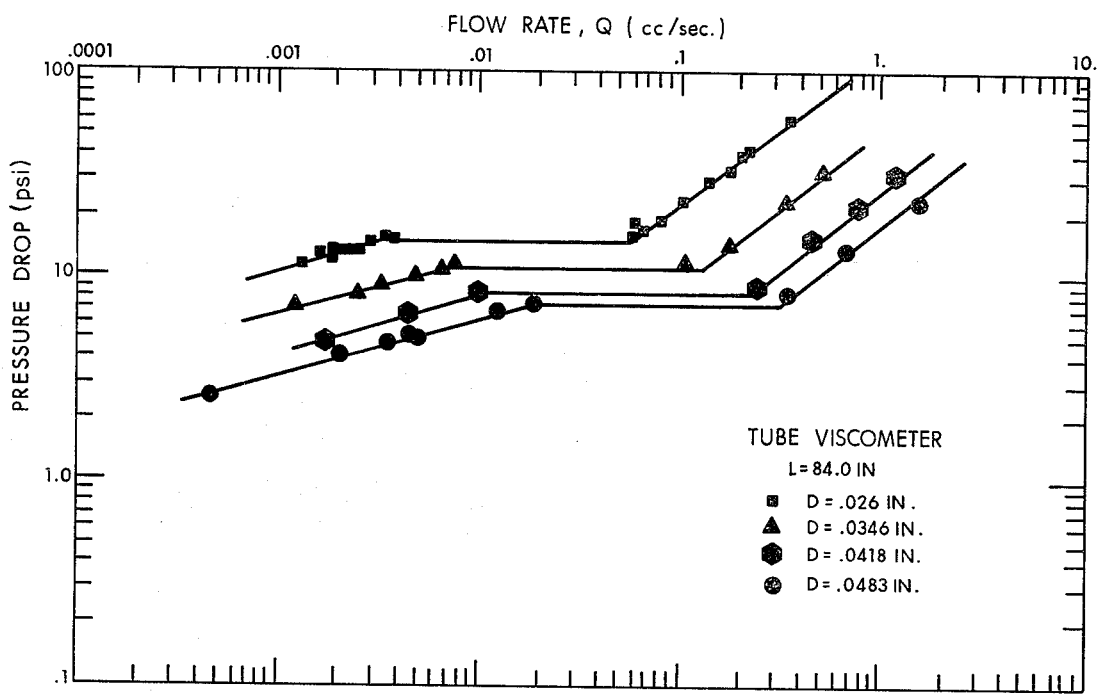
Fig. 3 APPARENT VISCOSITY vs. SHEAR RATE CURVE
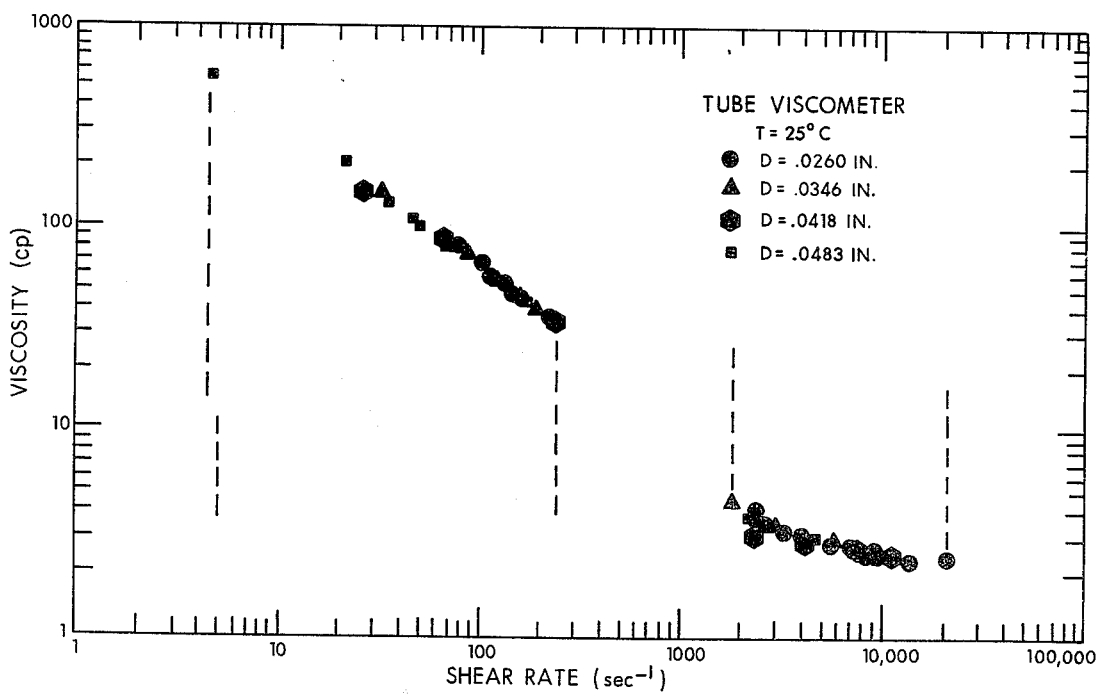

LAMELLAR MICELLE CONTAINING COMPOSITIONS WHICH EXHIBIT RETRO-VISCOUS PROPERTIES

CROSS REFERENCE TO RELATED APPLICATION

This application is a continuation-in-part of our copending U.S. Pat. application Ser. No. 375,293, filed June 29, 1973, now abandoned.

BACKGROUND OF THE INVENTION

1. Field of the Invention

This invention pertains to micellar solutions made up of water, surfactant, hydrocarbon, and optionally cosurfactant and/or electrolyte and contain lamellar micelles.

2. Description of the Prior Art

Zlochower and Schulman, in the *Journal of Colloid and Interface Science*, Vol. 24, No. 1, May, 1967 pp. 115-124 define a liquid crystal obtained from a composition consisting of amino methyl propanol, amino butanol oleate, water and benzene. The initial solution, i.e. before the liquid crystal, is an isotropic solution consisting of spherical droplets of chloroform in water. This is titrated with chloroform to form the liquid crystal and upon further addition of the chloroform, a second isotropic solution is formed with the chloroform as the external phase.

Canadian Pat. No. 921,690 teaches an oil recovery process using a micellar system containing 2–16% surfactant, 3–20% hydrocarbon, 1–5% alcohol and the remainder water which exhibits birefringence, shear thickening behavior at low shear rates and shear thinning behavior at high shear rates, etc. These systems do not exhibit retro-viscous properties as do Applicants' compositions.

Both oil-external and water-external micellar dispersions (this term includes microemulsions, micellar solutions, etc.) are described in the art, e.g. see U.S. Pat. Nos. 3,254,714 to Gogarty et al.; 3,497,006 to Jones et al.; 3,506,070 and 3,507,071 to Jones. In general, it is known that both oil-external and water-external micellar dispersions can be obtained using petroleum sulfonates having average equivalent weights within the range of 350 to about 525, the micellar dispersion also contains hydrocarbon, water, cosurfactant (can be alcohol, ester, amide, ether, aldehyde containing 1–20 carbon atoms) and/or electrolyte. These dispersions generally exhibit a decrease in viscosity upon increase in flow rate.

SUMMARY OF THE INVENTION

A large increase in flow rate under a very small pressure increase is one of the unique properties of the compositions of this invention. These compositions are optically clear, phase stable, exhibit birefringence, and the micelles preferably have an axial ratio of at least 10. The compositions contain 4–15% of a surfactant, about 30 to about 70% liquid hydrocarbon, about 15 to about 66% water, and optionally up to about 20% of a cosurfactant (preferably an alcohol containing 1–20 carbon atoms), and/or up to about 5% by weight, based on the water, of an electrolyte, e.g. inorganic salt.

DESCRIPTION OF THE DRAWINGS

In FIG. 1, the shear rate is plotted vs. the shear stress from Example 2 data. Up to a shear stress of about 95 dynes/cm$^2$ and after a shear stress of about 100 dynes/cm$^2$ the composition acts as a pseudo plastic fluid. Between these shear stresses is the unique retro-viscous property of this invention, i.e. the composition appears to have little or no resistance to flow at these shear stresses but at lower and higher shear stresses the composition appears viscous.

FIG. 2 shows the relation of pressure drop to flow rates in different size tubes. The tubes are made of stainless steel, are 84 inches long and have diameters as indicated in FIG. 1. Data for this drawing are obtained by titrating with distilled water an anhydrous composition containing 9.8% ammonium heptadecylbenzene sulfonate, 18.5% cyclohexanol, and 71.8% n-decane, the percents based on weight. On initial titration, it is postulated that spherical microemulsion droplets are obtained. Further titration with water results in lamellar micelles. Compositions with lamellar micelles exhibit unique flow properties, i.e. large increases in flow rate for small increases in pressure. Additional titration with water leads to spherical micelles and a water-external system which has Newtonian flow properties.

FIG. 3 represents the relationship of apparent viscosity vs. shear rate in the tubes identified in FIG. 2, these data obtained at 25°C. The discontinuity of the graph in this Figure is characteristic of the retro-viscous compositions of this invention.

DESCRIPTION OF PREFERRED EMBODIMENTS OF INVENTION

The compositions of this invention contain lamellar micelles which have an axial ratio (ratio of length divided by diameter) of at least 3.5, preferably at least 10 and more preferably at least about 20. They are optically clear, phase stable, exhibit birefringence, and preferably have a viscosity of at least 75 cps (when relatively low viscous components are used) at a shear rate of 10 sec$^{-1}$ at 23°C. When under flowing conditions and at particular pressures, an increase in pressure, e.g. up to 5%, will effect a substantially large increase in flow rate of the composition, e.g. 20-fold increase. These compositions are like liquid crystals in that they exhibit birefringence. Also, the compositions have an elastic component which increases with shear rate, i.e. the faster you shear the composition, the more energy is stored in the composition.

The compositions contain water, surfactant, hydrocarbon, and optionally cosurfactant and/or electrolyte.

The surfactant is present in concentrations of about 4 to about 15 percent, preferably about 5.5 to about 12 percent and more preferably about 7 to about 9 percent. Carboxylates and sulfonates are useful as the surfactant. Preferably the surfactant is a sulfonate, more preferably an alkyl aryl sulfonate (includes petroleum sulfonates) having an average equivalent weight within the range of about 350 to about 525, preferably about 375 to about 500 and more preferably about 400 to about 470. Mono and/or polysulfonates are useful. Examples of such sulfonates include alkyl aryl sulfonate wherein the alkyl group contains about 6 to about 20 carbon atoms and preferably about 10 to about 17 carbon atoms, e.g. ammonium heptadecylbenzene sulfonate. Cation of the sulfonate is an alkali metal or ammonium. The sulfonate can be petroleum sulfonate, e.g. commercially available Shell sodium sulfonate which is a petroleum sulfonate having an average equivalent weight of about 470, and is 62% active sulfonate, available from the Industrial Chemical Division of Shell Chemical Company, Houston, Tex. Sonneborn Chemical and Refining Company, 300 Park Ave. South, New York, N.Y., markets sodium petroleum sulfonates useful with the invention:

1. Petronate L, average equivalent weight 415–430,
2. Petronate K, average equivalent weight 420–450,
3. Petronate HL, average equivalent weight 440–470,
4. Petronate CR, average equivalent weight 490–510, and
5. Pyronate 50, average equivalent weight 360.

The Sonneborn sulfonates generally contain about 62% active sulfonate, 33% mineral oil, about 4.5% water, and the balance salts. Bryton Chemical Company, 630 Fifth Ave., New York, N.Y. has a series of petroleum sulfonates that are useful:

1. Bryton F, sodium petroleum sulfonate having an average equivalent weight of 465,
2. Bryton T, sodium petroleum sulfonate having an average equivalent weight of 500,
3. Bryton ammonium sulfonate 35-K, an ammonium sulfonate having an average equivalent weight of 465

The sulfonates within the above equivalent weight range exhibit both oil- and water-solubility properties.

Useful carboxylates are preferably the monovalent cation and ammonium salts of fatty acids; they preferably have average equivalent weights within the range of about 200 to about 500 and preferably about 250 to about 400 and more preferably about 300 to about 375. Specific examples include the salts of the following acids: aliphatic acids such as cupric, lauric, myristic, palmitic and stearic; aromatic acids such as substituted benzoic, naphthoic, substituted naphthoic and similar aromatic acids; and in general saturated fatty acids and substituted products thereof and unsaturated fatty acids and substituted products thereof. Average equivalent weight is defined as the average molecular weight divided by the average number of carboxylate or sulfonate groupings per molecule. Thus, the equivalent weight of a sulfonate is equal to the molecular weight when the sulfonate is a mono sulfonate.

The hydrocarbon is present in concentrations of about 30 to about 70 percent, preferably about 40 to about 60 and more preferably about 45 to about 55 percent. The hydrocarbon can be crude oil (both sweet and sour crudes), partially refined fractions of a crude oil such as gasoline, kerosene, naphtha, liquefied petroleum gases, and other distillation cuts from fractionation of crude oil. Refined fractions of crude oil are also useful, such as jet fuel, "finished gasoline", benzene, toluene, xylene, propylene, butylene, etc. Also, the hydrocarbon can be a synthesized hydrocarbon including substituted paraffinic and aromatic hydrocarbons as well as halogenated hydrocarbons. Unsulfonated hydrocarbon within the petroleum sulfonates is also useful.

The water can be soft water, brackish water, or a brine. Concentration of the water is about 15 to about 66 percent, preferably about 20 to about 55 percent and more preferably about 25 to about 50 percent. If ions are present in the water, they are preferably compatible with the surfactant as well as other components within the composition.

The cosurfactant can be an alcohol, ester, aldehyde, ketone, ether, or like compound, e.g. a compound containing one or more of hydroxy, oxy, epoxy, amino, chloro, bromo or like groups or mixtures of cosurfactants. The cosurfactant generally contains 1 to about 20 or more and preferably about 3 to about 16 carbon atoms. Examples include isopropanol, n- and i- butanols, amyl alcohols, such as n-amyl alcohol, 1- and 2-hexanol, cyclohexanol, 1-octanol, decyl alcohols, alkaryl alcohols such as p-nonyl phenol, glycol monobutyl ether (butyl Cellusolve), diethylene glycol monobutyl ether (butyl Carbitol), ethoxylated alcohols and alcoholic liquors such as fusel oil. Ethoxylated alcohols, e.g. $RO(CH_2CH_2O)_nH$ wherein $n$ is about 1 to about 10 and R is alkyl containing about 6 to about 20 carbon atoms, are useful and of course these can contain more than 20 carbon atoms. The preferred cosurfactant is an aliphatic alcohol(s) including primary, secondary and/or tertiary alcohols. The cosurfactant is present in concentrations of up to about 20 percent and preferably about 0.001 to about 17 percent and more preferably about 0.1 to about 15 percent.

The electrolyte is present in concentrations up to about 5 percent and preferably about 0.001 to about 3 percent and more preferably about 0.01 to about 2.5 percent, based on the water. The electrolyte is an inorganic salt, inorganic base, inorganic acid or combination thereof. Specific examples include sodium hydroxide, sodium chloride, sodium sulfate, sodium nitrate, hydrochloric acid, sulfuric acid, ammonium chloride, ammonium hydroxide, ammonium sulfate, potassium chloride, etc. Other examples of electrolytes are taught in U.S. Pat. No. 3,330,343 to Tosch et al.

The addition of the electrolyte generally broadens the retro-viscous range of the composition. Retro-viscous, as used herein, is defined as the property of the composition to exhibit increased flow rates at negligible pressure drop. This means that the mixture can exhibit extremely low viscosity over a certain range of shear rates. That is, essentially little increase in pressure drop is required to increase the flow rate of the composition—see FIG. 2. Broadening out the retro-viscous range may be desired where the composition comes in contact with fluids which adversely influence this property, e.g. some formation fluids in subterranean reservoirs. That is, by starting with a broad retro-viscous range, the composition will be compatible over a wider range of environmental conditions before it degrades to a microemulsion.

Other components may be incorporated within the composition; but they should be compatible with the composition components and not impart a detrimental influence thereto. That is, the additional additives must not adversely influence the relationship of pressure drop to flow rate as the compositions of this invention are defined as having.

The compositions of this invention are made up of lamellar micelles which can be viewed as alternating layers of water and hydrocarbon with surfactant between these layers with the polar groups of the surfactant in the water. If the composition is obtained by titrating an oil-external microemulsion, it is postulated that the microemulsion has substantially spherical micelles and acts like a Newtonian fluid but upon further titration with water, the lamellar-type micelle is obtained.

The compositions of this invention are useful in many ways. For example, it can be used as a fracturing fluid where it is desired that the fluid suspend solids and be very pumpable, i.e., require minimum surface energy to pump the fluid down the wellbore and into the formation at fracturing pressures. Also, it is useful as a carrying agent in pipelines, especially since it has the property to keep in suspension solids such as comminuted oil shale, coal, congealed crude oil, etc. while being very pumpable. In addition, the composition is useful as a drilling fluid, cutting oil, a fluidic, carrier in pipelines, etc.

The following examples are representative of the compositions. Unless otherwise specified, all percents are based on weight.

EXAMPLE 1

To illustrate the criticality of the viscosity, the water concentration, etc., the following eight samples are presented. These samples are composed of identical components at the indicated percent by weight concentrations and are admixed under identical conditions:

TABLE I

|  | SAMPLE NUMBERS (% BY WEIGHT) | | | | | | | |
|---|---|---|---|---|---|---|---|---|
|  | 1 | 2 | 3 | 4 | 5 | 6 | 7 | 8 |
| $NH_4$-heptadecyl-benzene sulfonate | 9.0 | 7.7 | 7.4 | 7.3 | 7.2 | 7.15 | 6.1 | 7.18 |
| Cyclohexanol | 16.9 | 14.5 | 14.0 | 13.9 | 13.6 | 13.5 | 11.5 | 13.56 |
| n-Decane | 65.7 | 56.4 | 54.2 | 53.8 | 52.9 | 52.4 | 44.7 | 52.5 |
| Distilled Water | 8.3 | 21.4 | 24.3 | 25.0 | 26.2 | 27.0 | 37.6 | 26.7 |
| Viscosity (cp) at shear rate of 10 sec$^{-1}$ and 23°C. | 3.6 | 5.7 | 6.3 | 82.0 | 118.0 | 350.0 | 50.0 | 200.0 |

Of the above eight samples, only samples 4, 5, 6, and 8 are compositions of this invention. The viscosities of samples 1, 2, 3, and 7 are too low even though sample 7 has a viscosity of 50 cps. Sample 1 also has too low water concentration, i.e. 8.3 percent — the minimum water concentration of the invention composition is 15 percent. Samples 4, 5, 6, and 8 exhibit retro-viscous properties, i.e. essentially zero viscosity over particular shear rates; whereas samples 1, 2, 3, and 7 do not.

EXAMPLE 2

Sample 6 from Example 1 is studied. Pressure drop vs. flow rate in a stainless steel tube having a diameter of 0.2646 inch and a length of 132.38'.

TABLE II

| TUBE VISCOMETER | |
|---|---|
| ΔP (psi) | Q (cc/sec) |
| 13.45 | 0.0010 |
| 14.12 | 0.0011 |
| 16.60 | 0.0016 |
| 16.74 | 0.0016 |
| 16.74 | 0.0018 |
| 18.15 | 0.0391 |
| 23.20 | 0.0551 |
| 29.54 | 0.0806 |
| 32.46 | 0.0909 |
| 42.0 | 0.140 |
| 59.0 | 0.201 |
| 80.0 | 0.310 |
| 97.0 | 0.373 |

From the above data, it is evident that for a flow rate increase of between 0.0016 to 0.0391 cc/sec, the pressure drop across these flow rates is increased by 1.4 psi. This means that essentially only 7 percent increase in pressure is required to increase the flow of the mixture by more than 10-fold.

EXAMPLE 3

Additional samples of compositions obtained with sodium petroleum sulfonate are taught in Table III:

TABLE III

|  | 9 | 10 | 11 |
|---|---|---|---|
|  | % | % | % |
| Shell sulfonate | 12 | 12 | 17.3 |
| n-Decane | 50 | 50 | 37.1 |
| Distilled Water | 38 | 38 | 44.5 |
| Isopropanol | — | — | 1.1 |

The Shell sulfonate has an average equivalent weight of about 470 and is a monosulfonate. Except for Sample 9, activity of the Shell sulfonate is 62 percent, e.g. sample 10 contains 7.44 percent active sulfonate, the residue is vehicle oil or unreacted hydrocarbon and salts as a by-produce of the sulfonation. The Shell sulfonate used in Sample 9 is 100 percent active sulfonate.

EXAMPLE 4

These data are obtained as a function of titrating a stock solution of $NH_4$-heptadecylbenzene-p-sulfonate cyclohexanol and n-decane with distilled water. These data suggest that as the water is added, an inversion from an oil-external system to a water-external system occurs. Although all seven samples are optically clear, only samples 14, 15, 16 and 17 exhibit birefringence as evidenced by the depolarization of incident light (these data are obtained with a Brice-Phoenoix light scattering photometer) and samples 12, 13 and 18 show no birefringence. The viscosity data and depolarization measurements suggest that as water is added to the system, small spherical water droplets suspended in decane (note the specific conductivity of sample 1) change to lamellar structures. Such a change can be considered as alternating layers of water and decane with the sulfonate and cyclohexanol oriented between these layers with their polar groups in the aqueous phase. The data for sample 18 suggests complete inversion to small oil droplets suspended in water. Data for these seven samples are illustrated in Table IV:

TABLE IV

| | FLUID PROPERTIES | | |
|---|---|---|---|
| Sample Number | Specific Conductivity (mhos/cm) | Viscosity (cp) | Depolarization (IH/Iv) |
| 12 | 4 × 10$^{-6}$ | 4 | 0 |
| 13 | 1 × 10$^{-3}$ | 8 | 0 |
| 14 | 1.6 × 10$^{-3}$ | 9 | 1.0 |
| 15 | 1.7 × 10$^{-3}$ | 98 | 1.0 |
| 16 | 1.7 × 10$^{-3}$ | 450 | 1.0 |
| 17 | 1.7 × 10$^{-3}$ | 1000 | 1.0 |
| 18 | 1.7 × 10$^{-3}$ | 250 | 1.0 |

Under specific conductivity, mhos is defined as 1/ohms and cm is centimeter. The viscosity is obtained on a Brookfield viscometer run at 6 rpm at 23°C. IH and IV are defined as intensity of the horizontal component of scattered light from the fluid and intensity of the vertical component of the same light, respectively.

Fluid samples 12 and 13 are oil-external microemulsions whereas sample 7 is a water-external microemulsion and samples 14, 15, 16, and 17 are in the transition stage between an oil-external microemulsion and a water-external microemulsion and are representative of compositions of this invention.

Pressure drop (PSI) vs. flow rate (cc/sec) in a tube viscometer having dimensions as indicated in the tables for samples 15–19 are plotted in Tables V, VI, VII, VIII and IX ($T_w$ = shear stress at the wall of the tube, $\Delta v/\Delta r$ = shear rate and $\mu a$ = apparent viscosity):

TABLE V

FLUID 12
TUBE VISCOMETER - L = 213.99 cm, D = 0.066 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 1.60 | .00635 | 8.48 | 235 | 3.6 |
| 1.64 | .00599 | 8.72 | 222 | 3.9 |
| 8.10 | .0437 | 43.0 | 1623 | 2.6 |
| 8.13 | .0461 | 43.2 | 1712 | 2.5 |
| 19.16 | .1206 | 101.9 | 4477 | 2.3 |
| 19.06 | .1246 | 101.4 | 4628 | 2.2 |
| 19.06 | .1218 | 101.4 | 4313 | 2.4 |
| 29.4 | .1935 | 156.4 | 6852 | 2.3 |
| 52.5 | .338 | 279.3 | 11966 | 2.3 |
| 52.0 | .330 | 276.6 | 11685 | 2.4 |
| 52.0 | .332 | 276.6 | 11753 | 2.4 |
| 71.3 | .458 | 379.3 | 16214 | 2.3 |
| 71.3 | .454 | 379.3 | 16075 | 2.4 |
| 140.0 | .859 | 744.7 | 30415 | 2.4 |
| 140.0 | .903 | 744.7 | 31973 | 2.3 |

TABLE VI

FLUID 13
TUBE VISCOMETER - L = 213.99 cm, D = 0.066 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 5.4 | .0215 | 28.7 | 696 | 4.1 |
| 7.1 | .0295 | 37.7 | 954 | 3.9 |
| 7.0 | .0301 | 37.3 | 973 | 3.8 |
| 9.2 | .0400 | 48.9 | 1294 | 3.8 |
| 14.2 | .0648 | 75.5 | 2096 | 3.6 |
| 13.5 | .0631 | 71.8 | 2041 | 3.5 |
| 13.5 | .0610 | 71.8 | 1973 | 3.6 |
| 19.6 | .0960 | 104.2 | 3106 | 3.3 |
| 19.3 | .0980 | 102.7 | 3170 | 3.2 |
| 19.3 | .1024 | 102.7 | 3312 | 3.1 |
| 29.5 | .1576 | 156.9 | 5097 | 3.1 |
| 29.5 | .1577 | 156.9 | 5100 | 3.1 |
| 43.0 | .2488 | 228.7 | 8049 | 2.8 |
| 42.5 | .2521 | 226.1 | 8156 | 2.8 |
| 59.0 | .3448 | 313.8 | 11152 | 2.8 |
| 58.8 | .3450 | 312.8 | 11159 | 2.8 |
| 100.0 | .668 | 531.9 | 21609 | 2.5 |
| 100.0 | .662 | 531.9 | 21415 | 2.5 |
| 100.0 | .671 | 531.9 | 21708 | 2.45 |

TABLE VII

FLUID 16
TUBE VISCOMETER - L = 213.99 cm, D = 0.066 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 3.9 | .000299 | 20.8 | 13.3 | 156 |
| 10.5 | .00195 | 56.0 | 86.6 | 64.7 |
| 12.2 | .00285 | 65.1 | 126.8 | 51.3 |
| 12.8 | .00288 | 68.3 | 128.4 | 53.2 |
| 12.8 | .00299 | 68.3 | 132.9 | 51.4 |
| 18.0 | .00670 | 96.0 | 298.0 | 32.2 |
| 18.8 | .0700 | 100.3 | 2663 | 3.8 |
| 19.1 | .0750 | 101.9 | 2853 | 3.6 |
| 26.8 | .113 | 143.0 | 4299 | 3.3 |
| 31.9 | .135 | 170.2 | 5133 | 3.3 |
| 41.0 | .195 | 218.8 | 7418 | 2.9 |
| 73.0 | .410 | 389.5 | 15598 | 2.5 |

TABLE VIII

FLUID 15
TUBE VISCOMETER - L = 336.24 cm, D = 0.0672 cm

| $\Delta P$ psi | Q cc/sec | $T_w$ dynes/cm$^2$ | $\Delta v/\Delta r$ sec$^{-1}$ | $\mu a$ cp |
|---|---|---|---|---|
| 13.45 | .00103 | 46.33 | 53.8 | 86.1 |
| 14.12 | .00105 | 48.61 | 54.9 | 88.5 |
| 16.60 | .00164 | 57.16 | 85.7 | 66.7 |
| 16.74 | .0016 | 57.66 | 83.6 | 69.0 |
| 16.74 | .0018 | 57.66 | 94.1 | 61.3 |
| 18.15 | .0391 | 62.60 | 1393.0 | 4.5 |
| 18.46 | .00261 | 63.58 | 136.3 | 46.7 |
| 23.20 | .0551 | 79.89 | 1963 | 4.1 |
| 29.54 | .0806 | 101.75 | 2872 | 3.5 |
| 32.46 | .0909 | 111.81 | 3239 | 3.4 |
| 42.0 | .140 | 144.67 | 4989 | 2.9 |
| 59.0 | .201 | 203.22 | 7163 | 2.8 |
| 80.0 | .310 | 275.55 | 11048 | 2.5 |
| 97.0 | .373 | 334.11 | 13292 | 2.5 |

TABLE IX

FLUID 19
TUBE VISCOMETER - L = 213/26 cm, D = 0.066 cm

| $\Delta P$ psi | Q cc/sec | $T_w$ dynes/cm$^2$ | $\Delta v/\Delta r$ sec-1 | $\mu a$ cp |
|---|---|---|---|---|
| 11.7 | .00354 | 62.4 | 126.8 | 49 |
| 17.0 | .0052 | 90.7 | 186.2 | 49 |
| 38.8 | .01245 | 207.0 | 446.0 | 46 |
| 65.0 | .0214 | 346.7 | 766.5 | 45 |
| 98.5 | .0333 | 525.5 | 1192.7 | 44 |

Samples 17 and 18, for example, are quite unique. Sample 17 has a structural rearrangement within the fluid up to a shear rate of 300 sec$^{-1}$ at which time the fluid collapses and offers essentially no resistance to flow until the shear rate reaches 2,600 sec$^{-1}$ at which time the fluid reverts to a non-Newtonian flow characteristic. Sample 18 behaves the same way, except the collapse occurs at a shear rate of 135 sec$^{-1}$ and does not recover until 1400 sec$^{-1}$. This behavior is observed with both fluids, whether or not the fluid is exposed to an increasing or decreasing sequence of shear rates, with no hysteresis.

Samples 12 and 13 are not compositions of this invention because they do not exhibit retro-viscous properties

EXAMPLE 5

To show that the surfactant of the invention is critical, the following example is presented:

A composition is obtained by mixing 32.8% distilled water, 31.5% dodecyl trimethyl ammonium bromide (the surfactant) and 35.7% chloroform. Pressure drop as $\Delta P$ (psi) vs. flow rate, Q (cc/sec) data are obtained as reported in Table X:

TABLE X

TUBE VISCOMETER DATA

| $\Delta P$(psi) | Q(cc/sec) |
|---|---|
| 20.0 | .04247 |
| 28.44 | .07938 |
| 40.0 | .1386 |
| 40.0 | .1474 |
| 49.8 | .2010 |
| 70.0 | .3670 |
| 70.0 | .3704 |
| 70.0 | .380 |
| 84.0 | .5481 |
| 100.0 | .700 |
| 100.0 | .7010 |
| 100.0 | .7580 |

These data are obtained in a tube viscometer having a diameter of 0.0483 inch and a length of 84 inches. As these data indicate, a substantially large increase in flow rate is not observed at small increases in ΔP.

It is not intended that the above examples limit the invention in any way; rather, all equivalents obvious to those skilled in the art are intended to be incorporated within the scope of the invention as defined within the specification and appended claims.

What is claimed is:

1. A composition containing lamellar micelles having an axial ratio of at least 3.5 and which is substantially optically clear, substantially phase stable, exhibits birefringence, and exhibits a substantial increase in flow rate at minor increase in pressure drop while the fluid is under flow conditions at a certain pressure, the composition having a viscosity of at least 75 cps. at a shear rate of 10 sec$^{-1}$ and is comprised of about 30 to about 70% of a liquid hydrocarbon, about 15 to about 66% of water, and about 4 to about 15% of surfactant which is a sulfonate having an average equivalent weight of 350 to about 525, or a carboxylate having an average equivalent weight of about 200 to about 500, the percents based on weight.

2. The composition of claim 1 wherein the surfactant is a petroleum sulfonate containing an alkali metal or ammonium cation.

3. The composition of claim 1 wherein it contains up to about 20% by weight of a cosurfactant containing from 1 to 20 carbon atoms which is an alcohol, ether aldehyde, ester, ketone, or a mixture thereof.

4. The composition of claim 1 wherein it contains up to about 5% by weight of an electrolyte which is an inorganic salt, inorganic base, inorganic acid or combination thereof.

5. The composition of claim 1 wherein the surfactant is present in concentrations of about 5.5 to about 12 percent, the hydrocarbon is present in concentrations of about 40 to about 60 percent and the water is present in concentrations of about 20 to about 55 percent.

6. A composition containing lamellar miscelles having an axial ratio of at least 3.5 and which composition is substantially optically clear, substantially phase stable, exhibits birefringence, and exhibits a substantial increase in flow rate at minor increase in pressure drop while the fluid is under flow conditions at a certain pressure comprised of about 4 to about 15% of an alkyl aryl sulfonate having an average equivalent weight within the range of about 350 to about 525, about 30 to about 70% of a liquid hydrocarbon, about 15 to about 66% of water, and about 0.01 to about 20% of a cosurfactant containing 1 to about 20 carbon atoms.

7. The composition of claim 6 wherein it contains about 0.001 to about 5 percent, based on the water, of an inorganic salt, inorganic acid, inorganic base, or combination thereof.

8. The composition of claim 6 wherein the sulfonate is a petroleum sulfonate.

9. The composition of claim 6 wherein the sulfonate has an average equivalent weight within the range of 375 to about 500.

10. The composition of claim 6 wherein the sulfonate has an average equivalent weight within the range of 400 to about 470.

11. The composition of claim 6 wherein the hydrocarbon concentration is about 45 to about 55 percent.

12. The composition of claim 6 wherein the hydrocarbon is a crude oil, partially refined fraction of a crude oil, or a refined fraction of a crude oil.

13. The composition of claim 6 wherein the water is present in concentrations of about 25 to about 50% by weight.

* * * * *

UNITED STATES PATENT OFFICE
CERTIFICATE OF CORRECTION

Patent No. 3,954,627   Dated   May 4, 1976

Inventor(s)  Karl D. Dreher and William B. Gogarty

It is certified that error appears in the above-identified patent and that said Letters Patent are hereby corrected as shown below:

Column 7, Table VI, under the column entitled, "Q, cc/sec", line 49 (second figure from the bottom), delete "662" and substitute therefor --.662--

Column 8, Table VIII, under column entitled, "$T_w$, dynes/cm$^2$", line 10 (6th figure from the top), delete "62.60" and substitute therefor --62.50--

Column 8, Table IX, in the title, delete "213/26 cm" and substitute therefor --213/36 cm--

Signed and Sealed this

Twelfth Day of June 1979

[SEAL]

Attest:

RUTH C. MASON
Attesting Officer

DONALD W. BANNER
Commissioner of Patents and Trademarks